(12) United States Patent
Marsala et al.

(10) Patent No.: US 10,926,579 B2
(45) Date of Patent: *Feb. 23, 2021

(54) SYSTEM AND METHOD FOR SELECTING PAINT COMPOSITIONS PER LAYER BASED ON SUBSTRATE CONDITIONS

(71) Applicant: Spray-Net Franchises Inc., Quebec (CA)

(72) Inventors: Carmelo Marsala, Quebec (CA); Peiman Arabi, Quebec (CA)

(73) Assignee: SPRAY-NET FRANCHISES INC., Québec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/339,590

(22) PCT Filed: Jun. 2, 2017

(86) PCT No.: PCT/CA2017/050674
§ 371 (c)(1),
(2) Date: Apr. 4, 2019

(87) PCT Pub. No.: WO2018/064749
PCT Pub. Date: Apr. 12, 2018

(65) Prior Publication Data
US 2020/0039285 A1 Feb. 6, 2020

Related U.S. Application Data

(63) Continuation-in-part of application No. PCT/CA2016/051156, filed on Oct. 4, 2016.

(51) Int. Cl.
*B44D 3/00* (2006.01)
*B05D 7/04* (2006.01)
*B05D 7/24* (2006.01)
*G05B 13/02* (2006.01)
(Continued)

(52) U.S. Cl.
CPC .......... *B44D 3/003* (2013.01); *B01F 13/1063* (2013.01); *B05D 7/00* (2013.01);
(Continued)

(58) Field of Classification Search
CPC ... B05D 7/00; B05D 7/04; B05D 7/24; G05D 21/02
(Continued)

(56) References Cited

U.S. PATENT DOCUMENTS 5,626,958 A 5/1997 D'Herbercourt et al.
6,714,924 B1 * 3/2004 McClanahan .......... B44D 3/003
382/156

(Continued)

FOREIGN PATENT DOCUMENTS

KR 100500408 7/2005

*Primary Examiner* — Md Azad
(74) *Attorney, Agent, or Firm* — Leason Ellis LLP

(57) ABSTRACT

Expert system and method for computing an application procedure for painting vinyl panels a target color at a paint application site while preventing vinyl warping. A target reflectivity indicator is computed for the vinyl panels once painted. When the target color and target reflectivity indicator are met by application of the multiple paint layers, the application procedure computed identifies a pigmentable waterborne paint composition, one or more proportioned paint pigments to achieve the target color at a predictable transmissivity and a preparatory waterborne paint composition considering a corresponding predictable reflectivity. Applying the pigmentable waterborne paint composition, once pigmented with the one or more proportioned paint pigments, over the preparatory waterborne paint composition meets the target reflectivity indicator for the vinyl panels at the target color. Instructions are then sent to a (Continued)

remote device comprising the application procedure for painting the vinyl panels at the target color while preventing vinyl warping.

22 Claims, 4 Drawing Sheets

(51) Int. Cl.
  *B01F 13/10* (2006.01)
  *B05D 7/00* (2006.01)
  *G05D 21/02* (2006.01)
(52) U.S. Cl.
  CPC ............... *B05D 7/04* (2013.01); *B05D 7/24* (2013.01); *G05B 13/028* (2013.01); *G05D 21/02* (2013.01); *B01F 2215/005* (2013.01)
(58) Field of Classification Search
  USPC .......................................................... 700/283
  See application file for complete search history.

(56) References Cited

U.S. PATENT DOCUMENTS

| | | |
|---|---|---|
| 8,287,998 B2 | 10/2012 | Skelhorn |
| 2004/0122648 A1 | 6/2004 | Ando |
| 2005/0096796 A1* | 5/2005 | Filev .................... G05B 13/027 700/283 |
| 2009/0157212 A1 | 6/2009 | McClanahan et al. |
| 2009/0240363 A1 | 9/2009 | Hughes |
| 2012/0052317 A1* | 3/2012 | Shi ...................... C09B 67/0033 428/522 |
| 2015/0127269 A1* | 5/2015 | Bell ........................ G01J 3/504 702/22 |
| 2016/0018318 A1* | 1/2016 | Borges .................. G01N 21/25 356/369 |
| 2018/0296995 A1 | 10/2018 | Kinnen |
| 2019/0085182 A1* | 3/2019 | Goedhart .............. C09C 1/0021 |

* cited by examiner

SYSTEM AND METHOD FOR SELECTING PAINT COMPOSITIONS PER LAYER BASED ON SUBSTRATE CONDITIONS

CROSS-REFERENCE TO RELATED PATENT APPLICATIONS

This non-provisional patent application is a U.S. National Phase Application under 35 U.S.C. § 371 of International Patent Application No. PCT/CA2017/050674, filed Jun. 2, 2017, which is continuation-in-part of PCT patent application entitled "SYSTEM AND METHOD FOR SELECTING PAINT COMPOSITIONS BASED ON EXPECTED PAINT APPLICATION CONDITIONS", application number PCT/CA2016/051156, filed Oct. 4, 2016, in the name of SPRAY-NET CANADA INC., all of which are incorporated by reference, as if expressly set forth in their respective entireties herein.

TECHNICAL FIELD

The present invention relates to a paint compositions and, more particularly, to different exterior paint compositions.

BACKGROUND

Different materials are used to cover exterior of houses. Vinyl is a very popular material for covering houses. Typically, long and narrow panels made of colored unplasticized polyvinyl chloride (uPVC or simply PVC or vinyl) are intertwined over exterior walls. It has been noticed that vinyl panels, after being painted, sometimes have a greater tendency to warp than unpainted vinyl panels.

The present invention addresses this problem.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to an expert system for computing an application procedure for painting vinyl panels a target color at a paint application site while preventing vinyl warping. The system comprises a non-transitory memory, a processing module comprising one or more processors and a network interface module comprising one or more physical network interface. A first set of software instructions, stored in the non-transitory memory, when executed by the processing module, obtain a thickness indicator of the vinyl panels to be painted at the paint application site considering a request received, for the application procedure at the application site, through the network interface module from a remote device. A second set of software instructions, stored in the non-transitory memory, when executed by the processing module, compute, based on the thickness indicator and the target color for the vinyl panels, a target reflectivity indicator for the vinyl panels once painted for preventing vinyl warping. A third set of software instructions, stored in the non-transitory memory, when executed by the processing module, determine that the target reflectivity indicator for the vinyl panels once painted the target color is met by application of multiple paint layers of different paint compositions. A fourth set of software instructions, stored in the non-transitory memory, when executed by the processing module upon determination that the target color is met by application of the multiple paint layers compute the application procedure. The computed application procedure that identifies a pigmentable waterborne paint composition, one or more proportioned paint pigments to achieve the target color at a corresponding predictable transmissivity and a preparatory waterborne paint composition considering a corresponding predictable reflectivity. Applying the pigmentable waterborne paint composition, once pigmented with the one or more proportioned paint pigments, over the preparatory waterborne paint composition on the vinyl panels meets the target reflectivity indicator at the target color. The fourth set of software instructions, stored in the non-transitory memory, when executed by the processing module also send instructions, through the network interface module to the remote device, comprising the application procedure for painting the vinyl panels at the target color while preventing vinyl warping.

The non-transitory memory may comprise one or more preparatory records each associated with one of at least one preparatory waterborne paint composition of predictable reflectivity, a plurality of pigment records each associated with a paint pigment having a pigmentation identifier and one or more pigmentable records each associated with at least one pigmentable waterborne paint composition of predictable transmissivity once pigmented.

The third set of software instructions, when executed by the processing module, may further determine that the target reflectivity indicator for the vinyl panels once painted the target color is met by application of a self-standing pigmentable waterborne paint composition. The fourth set of software instructions, when executed by the processing module, may then compute the application procedure that identifies the self-standing pigmentable waterborne paint composition and the one or more proportioned paint pigments to achieve the target the target reflectivity indicator at the target color. Applying the self-standing pigmentable waterborne paint composition, once pigmented with the one or more proportioned paint pigments, in such a case, meets the target reflectivity indicator for the vinyl panels at the target color. The non-transitory memory may further comprise one or more self-standing pigmentable records each associated with at least one self-standing pigmentable waterborne paint composition.

Optionally, the thickness indicator for the plurality of vinyl panels may be a thickness value measured physically at the site, evaluated visually at the site, obtained from a default thickness indicator associated with the paint application site, determined considering a current color of the vinyl panels and/or determined considering an unpainted-color of the vinyl panels.

The expert system may optionally further comprise a fifth set of software instructions, stored in the non-transitory memory, that, when executed by the processing module, obtain surface characteristics for the vinyl panels comprising sun position data for geographical coordinates of the painting site and geographical alignment value of the vinyl panels. Computing the target reflectivity indicator may then further be based on the surface characteristics.

The expert system may optionally further comprise a sixth set of software instructions, stored in the non-transitory memory, that, when executed by the processing module, compute an adjustment procedure for adjusting one or more of the waterborne paint compositions using one or more chemical compounds. Computing the adjustment procedure may yet further comprise computing an expected surface temperature value of the vinyl panels at an expected time of application.

The thickness indicator may provide a range thickness value for thicknesses of one or more of the vinyl panels and computing the target reflectivity indicator may further comprise matching the range thickness value with an acceptable reflectivity range value.

In some embodiments, the one or more proportioned pigments may each be identified with a relative value established in relation to the pigmentable waterborne paint composition or the self-standing pigmentable waterborne paint composition. Alternately or in addition, the one or more proportioned pigments may each be identified with an absolute volumetric value established in relation to a volume of a container of the pigmentable waterborne paint composition or the self-standing pigmentable waterborne paint composition.

The expert system may further compute a second application procedure for the paint application site for a different set of vinyl panels (e.g., different target color and/or different thickness or thickness indicator and/or different surface characteristics (different sun orientation, etc.)).

A second aspect of the present invention is directed to a method for computing an application procedure for painting vinyl panels a target color at a paint application site while preventing vinyl warping. The method comprises at a processing module of an expert system, obtaining a thickness indicator of the vinyl panels to be painted at the paint application site considering a request received from a remote device for the application procedure. The method continues with computing, at the processing module of the expert system, based on the thickness indicator and the target color for the vinyl panels, a target reflectivity indicator for the vinyl panels once painted for preventing vinyl warping before determining that the target reflectivity indicator for the vinyl panels once painted the target color is met by application of multiple paint layers of different paint compositions. Upon determination that the target color is met by application of the multiple paint layers, the method follows with computing the application procedure that identifies a pigmentable waterborne paint composition, one or more proportioned paint pigments to achieve a predictable transmissivity at the target color and a preparatory waterborne paint composition considering a corresponding predictable reflectivity. Applying the pigmentable waterborne paint composition, once pigmented with the one or more proportioned paint pigments, over the preparatory waterborne paint composition meets the target reflectivity indicator for the vinyl panels at the target color. The method then follows with sending instructions comprising the application procedure for painting the vinyl panels at the target color while preventing vinyl warping.

Optionally, the method may further comprise determining at the processing module that the target reflectivity indicator for the vinyl panels once painted the target color may be met by application of a self-standing pigmentable waterborne paint composition considering corresponding predictable reflectivity and, upon determination that the target reflectivity indicator at the target color is met by application of the self-standing pigmentable waterborne paint composition, computing the application procedure that identifies the self-standing pigmentable waterborne paint composition and the one or more proportioned paint pigments to achieve the target color. In such a case, applying the self-standing pigmentable waterborne paint composition, once pigmented with the one or more proportioned paint pigments, meets the target reflectivity indicator for the vinyl panels at the target color.

In some embodiments, the thickness indicator for the plurality of vinyl panels is a thickness value measured physically at the site, evaluated visually at the site, obtained from a default thickness indicator associated with the paint application site, determined considering a current color of the vinyl panels and/or determined considering an unpainted-color of the vinyl panels.

The method may also optionally comprise obtaining surface characteristics for the vinyl panels comprising sun position data for geographical coordinates of the painting site and geographical alignment value of the vinyl panels. Computing the target reflectivity indicator is then further based on the surface characteristics.

The method mat also optionally comprise computing an adjustment procedure for adjusting one or more of the waterborne paint compositions using one or more chemical compounds. Computing the adjustment procedure may then further comprise computing an expected surface temperature value of the vinyl panels at an expected time of application.

The thickness indicator may provide a range thickness value for thicknesses of one or more of the vinyl panels and wherein computing the target reflectivity indicator further comprises matching the range thickness value with an acceptable reflectivity range value.

In some embodiments, the one or more proportioned pigments may each be identified with a relative value established in relation to the pigmentable waterborne paint composition or the self-standing pigmentable waterborne paint composition. Alternately, or in addition, the one or more proportioned pigments may each be identified with an absolute volumetric value established in relation to a volume of a container of the pigmentable waterborne paint composition or the self-standing pigmentable waterborne paint composition.

In some embodiments, the method may also compute a second application procedure for the paint application site for a different set of vinyl panels (e.g., different target color and/or different thickness or thickness indicator and/or different surface characteristics (different sun orientation, etc.)).

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
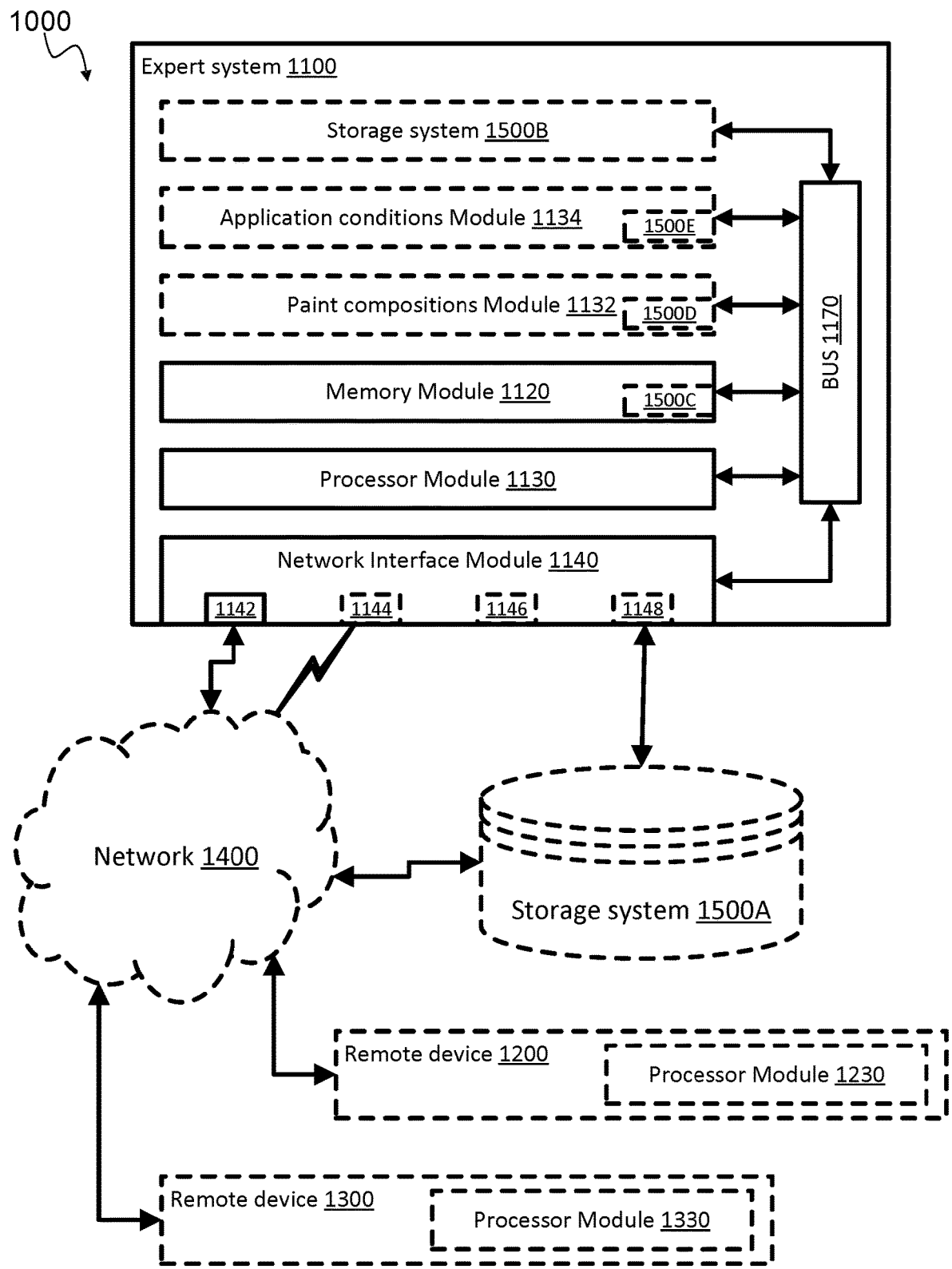
FIG. 1 is a module representation of an exemplary system in accordance with an embodiment of the present invention.

As previously mentioned, painted vinyl panels, after being painted, sometimes have a greater tendency to warp than unpainted vinyl panels. Conversely, it is possible that some unpainted vinyl panels that exhibited a tendency to warp react better after being painted. Vinyl panel warping, or vinyl warping, is defined in the context of the present invention as a deformation of the vinyl panel that is or would be perceptible to the eye when the vinyl panel is installed on a house or other structure. It has been noticed that certain conditions of exposition to the sun at different ambient temperature may cause vinyl warping. The position of an eventual visible deformation does not matter in the context of the present invention. The general purpose of the present invention is to minimize the risks of vinyl panel warping for painted vinyl panels.

Thicker vinyl panels do not tend to exhibit vinyl warping, which typically holds true whether the vinyl panel is painted or not and also holds true no matter what paint color is applied to the vinyl panel. However, thinner vinyl panels have a higher tendency to wrap, especially when painted with darker colors. The thickness of the vinyl panel typically varies between 0.035 inch and 0.055 inch (0.9 mm to 1.4 mm). Though advertising material sometimes mention thicknesses between 0.35 mm and 0.55 mm, it appears to be a mistaken measurement unit these would be too thin—and are simply not sold on the market.

Research has been done from these observations to provide a paint procedure that would minimize, or would not increase, the likelihood of vinyl warping of vinyl panels once painted.

The heat stability of the vinyl used in common vinyl panels is poor and the vicat softening temperature is therefore typically low. Considering that the vicat softening temperature is constant for all vinyl panel thicknesses, it may be that thicker vinyl panels support higher temperature before exhibiting vinyl warping (e.g., general better mechanical stability of the thicker panels), but it appears more plausible that thicker panels present a greater volume of matter that can absorb more energy before reaching the vicat softening temperature. In any case, the ability of the vinyl panels to diffuse energy is critical.

Radiant energy is defined as energy of electromagnetic radiation in the present context, typically expressed in joules (J). Radiant exposure is defined as radiant energy for a surface per unit area, typically expressed in watts per square meters ($J/m^2$ or $J \cdot m^{-2}$). Radiant-related values are also often expressed per unit of time (i.e., power-related units instead or energy-related units). Radiant flux (or radiant power) is defined as radiant energy for a surface per unit of area over a period of time. As radiant flux is a measure of power (energy over time), and not strictly a measure of energy, it is most often expressed in joules per second ($J/s$ or $J \cdot s^{-1}$) or watts (W). Irradiance is defined as radiant flux received by a surface per unit area, typically expressed in watts per square meters ($W/m^2$, $W \cdot m^{-2}$, $J/s \cdot m^2$ or $J \cdot s^{-1} \cdot m^{-2}$). Irradiance therefore corresponds to the rate at which radiant flux is delivered onto a surface. Radiant exitance is defined as radiant flux delivered away from a surface per unit area or, said differently, the rate at which radiant flux is delivered away from a surface, typically also expressed in watts per square meters ($W/m^2$, $W \cdot m^{-2}$, $J/s \cdot m^2$ or $J \cdot s^{-1} \cdot m^{-2}$). The radiant energy-related concepts are typically dependent upon the wavelength, or frequency, of the radiant energy, which then define a set of "spectral" values. The radiant energy-related concepts may also be discussed from the perspective of a point on a surface and a direction of propagation or hemispherical propagation. We will limit our discussion to the basic values as they appear sufficient for the skilled person to fully understand the teachings of the present invention.

As the skilled person will note, radiant exitance is composed of radiant flux reflected by the surface (related to capacity to reflect energy of the surface or reflectivity) and radiant flux emitted by the surface (related to capacity to emit absorbed energy of the surface or emissivity) as well as radiant flux transmitted through the surface (related to capacity to transmit energy of the surface or transmissivity). In order for the temperature of the surface to remain constant, the irradiance must be equal to the radiant exitance. In the context of the present discussion, the radiant flux transmitted by the vinyl panels once painted is considered negligible or constant (see below) and only the reflected and emitted radiant flux components from the radiant exitance are considered.

In order to remain at constant temperature, irradiance and radiant exitance from the painted vinyl panels must be equal. In the context of the present invention, it will be assumed that all energy absorbed by the vinyl panels is converted into thermal energy or, to the same effect, that energy consumed by other processes in the vinyl panels is negligible (e.g., color change requires some energy, etc.). In that context, emitted energy from the surface (related to the radiant flux emitted) will correspond to the absorbed energy, as the temperature would otherwise raise. The capacity of a surface to emit radiant energy is referred to as emissivity (between 0% and 100%). If emissivity of a surface augments, the energy absorbed by the surface augments as well. The radiant flux reflected does not affect temperature of the surface and, in the context of the temperature ranges relevant to present discussion, is not affected by the temperature of the surface. The capacity of a surface to reflect radiant energy is referred to as reflectivity (between 0% and 100%). The capacity of a surface to transmit radiant energy is referred to as transmissivity (between 0% and 100%). Considering a constant or irrelevant transmissivity of the painted vinyl panels, it can be appreciated that emissivity and reflectivity are complementary. In order to limit the energy absorbed by the vinyl panels, reflectivity should be maximized, which implies that emissivity is to be minimized.

Emissivity, generally discussed only for the infrared spectrum, is the ratio of the radiant exitance from a surface to the radiant exitance from a perfect black body at the same temperature. Any material, at a given temperature, emits radiant energy in the infrared spectrum. A perfect blackbody absorbs all incoming radiant energy, and does not reflect any. Said differently, the radiant exitance of a perfect blackbody does not comprise any reflected radiant flux. Emissivity can have a value from 0 (e.g., shiny mirror) to 1.0 (perfect blackbody). The surface roughness and many different factors will affect emissivity of a surface.

As a reference, from different sources, emissivity of "raw" vinyl appears to vary between 0.91 and 0.97 in the infrared spectrum. However, the emissivity of painted plastic is said to vary between 0.80 and 0.95. The present invention is focused on properly considering the effect of one or more paint compositions on reflectivity of painted vinyl panels.

For the purpose of the present description, it is sufficient to establish that the vinyl panels are expected to exhibit a desired color after being painted (e.g., radiant exitance in the visible spectrum from the perspective of the human eye, mainly reflected) while being able to diffuse (e.g., radiant exitance mainly in the infrared spectrum; reflected, emitted and transmitted) enough of the irradiance to maintain desired heat stability (e.g., controlled vinyl warping). It will also be assumed that the vinyl panels have a negligible radiant flux transmitted therethrough or, to the same effect, that the radiant flux transmitted remains constant for given thicknesses of the vinyl panels, no matter the type of paint composition(s) and number of paint layers applied thereon. The visible spectrum of the radiant exitance will not be analyzed further herein and it will be assumed that the skilled person will be able to determine the proper pigmentation to use in relevant paint compositions. However, potential effect on the radiant exitance, in the infrared spectrum, of the pigmentation and other component used in one or more of the paint compositions will be analyzed.

As previously discussed, different paint compositions, exhibit different emissivity. Transmissivity and reflectivity also vary between paint compositions. Within certain limits, it is possible to control emissivity, transmissivity and/or reflectivity of a paint composition. While transmissivity is considered constant or negligible for the vinyl panels once painted, it is not considered negligible for different layers of paint compositions applied on the vinyl panels. In fact, it has been determined that applying a layer of preparatory waterborne paint composition having a predictable reflectivity value before a applying a layer of pigmented waterborne paint composition having a predictable transmissivity value provides a resulting painted surface over the vinyl panels that has predictable reflectivity and emissivity values, with transmissivity of the painted vinyl panels, then, being considered negligible.

The present invention generally relates to systems and methods for computing an application procedure for painting vinyl panels a target color at a paint application site while preventing vinyl warping and/or for determining characteristics of pigmented waterborne paint compositions for preventing vinyl warping and/or for identifying proper pigmented waterborne paint compositions for preventing vinyl warping. In the context of the present invention, at least one preparatory waterborne paint composition is provided having a predictable reflectivity and more than two pigmented waterborne paint compositions, with different pigments, are provided having a predictable transmissivity once applied over a preparatory layer.

The present invention relies on the possibility of predictably establish the reflectivity of vinyl panels once painted by selecting one or more paint compositions applied thereon. One or more paint pigments are used in one or more layer to reach that the target color. The paint pigments are typically categorized as reflective ("solar reflective") or transmissive ("solar transparent"). Depending on the intended use of the paint composition once pigmented, the selection of the right pigments in the right quantity or proportion can be established. The method and system allow for determination of a target reflectivity (e.g., expressed as an indicator or as a value) for the painted vinyl panels at the target color considering thickness of the vinyl panels (e.g., thickness indicator expressed as a thickness value, range thickness value, etc.). The target reflectivity value is determined at least considering the thickness of the vinyl panels and may also be influenced by the target color.

From the target reflectivity, the method and system allow for determination as to whether the target reflectivity can be obtained using a single layer from a single paint composition (referred to hereinafter as a "self-standing" pigmentable paint composition). For instance, the target reflectivity may be achieved by adjusting a starting exterior waterborne paint composition into the self-standing paint composition using one or more chemical compounds (e.g., provided with the paint pigments or separately). In other embodiments, different self-standing paint compositions can be provided with different resulting reflectivity (e.g., depending on pigments) and a selection can be made between them. In certain circumstances, it may be preferable to rely on more than one layer of paint compositions. For instance, it may be that the target reflectivity cannot be met by a single layer or would be more difficult to meet with a single layer. It may be that the target reflectivity cannot be met because of the extent of the adjustment required, which would provide a paint composition that is inefficient, undesired or simply unworkable (e.g., characteristics of the paint composition such as flow characteristics (or fluidity) incompatible with application equipment(s), paint application conditions at the paint application site not compatible with required drying characteristics or hardening properties, etc.). It may also be that the target color can more predictably be achieved using two layers. The customer at the paint application site may also insist, for good or bad reasons, on more than one layer being applied. It may also be more cost-effective to apply two layers (e.g., considering the cost of the self-standing paint composition and/or of equipment required considering the self-standing paint composition or the likelihood of having to redo the painting considering warranty conditions, etc.)

When it is determined that two or more layers of paint compositions are to be applied on the vinyl panels to meet the target reflectivity at the target color, proper preparatory and pigmentable paint compositions are selected. It should be noted that the preparatory paint composition may also be pigmentable, but it has not been mentioned in every case for the sake of simplicity and readability of the present description. As mentioned previously, one or more paint pigments are used to obtain the target color in the right quantity or proportion. The selection of the proper pigmentable paint composition is made considering transmissivity characteristics thereof once pigmented when applied over the preparatory layer. The selection of the proper preparatory paint composition is made considering the reflectivity potential when the preparatory layer is covered by the pigmentable paint composition once pigmented. Essentially, when the preparatory paint composition and the colored pigmentable paint composition are applied successively, the vinyl panels will meet the target reflectivity at the target color.

In some embodiments, the self-standing paint composition, the preparatory paint composition and/or the pigmentable paint composition may be adjusted by selectively adding one or more chemical compounds in order to obtain adjusted waterborne paint composition(s) (e.g., pigmentable or not; self-standing or not; preparatory or not). The adjustment may be made for adjusting transmissivity and reflectivity thereof considering the target reflectivity once the vinyl panels are painted. The adjustment to transmissivity and reflectivity may be made, in that regard, by the paint pigment themselves and/or by specific chemical compounds. The adjustment may also be made, additionally or alternatively, for other reasons related to the expected application conditions at the paint application site (e.g., weather conditions for the application day and/or time).

Final proportion(s) of the added chemical compound(s) may be set within established tolerance intervals. A usual volume of starting exterior waterborne paint composition may be used to determine an actual volume to be added for each chemical compound. Different starting exterior waterborne paint compositions may also be provided and the method and system may therefore indicate which one of the starting exterior waterborne paint compositions is to be used and whether it is to be used without modification or actual volume(s) to be added for one or more chemical compounds.

The expected conditions comprise exterior substrate identification data (which comprise different types of vinyl compositions), environmental conditions expected for a predetermined application day and/or time at which the paint composition(s) are expected to be applied. The expected conditions may also comprise application equipment characteristics (e.g., spray, brush, and roller), geographical characteristics of the exterior surface including spatial alignment thereof. The environmental conditions may be obtained from forecast(s) and/or actual measurement(s). Examples of environmental conditions include weather conditions (e.g., air temperature and/or surface temperature, wind speed and direction, relative humidity and cloud coverage) and sun position. In some embodiments, the expected conditions are determined only once and, accordingly, the paint composition(s) may be selected/adjusted once. In other embodiments, the expected conditions are determined more than once (e.g., 24 hours before the application, when arriving on site and at the time of the application) and the paint composition(s) may then be adjusted more than once (while the paint composition(s) may be selected only once when more than one is available). As conditions change during application, the paint composition(s) may sometimes be adjusted again during application.

Reference is now made to the drawings, in which FIG. 1 shows a logical modular view of an exemplary expert system 1100 is depicted. The expert system 1100 is for computing an application procedure for painting vinyl panels a target color at a paint application site while preventing vinyl warping. The expert system comprises a processing module 1130, a memory module 1120 and a storage system 1500. In the depicted embodiment of FIG. 1, a networked group of computers 1000 comprises the expert system 1100. The networked group of computers 1000 is depicted with additional remote devices 1200 and 1300 that may send one or more request to the expert system 1100. The remote devices and the expert system 1100, 1200 and 1300 may be connected via a network 1400, via direct connections or a mix of direct and network connections. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

The processing module(s) 1130, 1230 and/or 1330 may represent a single processor with one or more processor cores or an array of processors, each comprising one or more processor cores. The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the computer system 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processing module 1130, memory module 1120 and network interface module 1140 usable in the context of the present invention will be readily apparent to persons skilled in the art.

A bus 1170 is depicted as an example of means for exchanging data between the different modules of the computer system 1100. The present invention is not affected by the way the different modules exchange information between them. For instance, the memory module 1120 and the processing module 1130 could be connected by a parallel bus, but could also be connected by a serial connection or involve an intermediate module (not shown) without affecting the teachings of the present invention.

Likewise, even though explicit mentions of the memory module 1120 and/or the processing module 1130, or explicit mentions of other modules in the computer systems 1200 and 1300, are not made throughout the description of the various embodiments, persons skilled in the art will readily recognize that such modules are used in conjunction with other modules of the computer system 1100, 1200 and/or 1300 to perform routine as well as innovative steps related to the present invention. Similarly, two systems 1100 and 1200 or 1300 may be involved for obtaining an adjusted exterior waterborne paint composition for an exterior surface to be painted at a paint application site.

In some embodiments, the expert system 1100 may comprise a dedicated paint compositions module 1132 dedicated to storing paint composition data and/or computing paint compositions. In other embodiments, alternatively or in addition, functions of the paint compositions module 1132 are shared with the processing module 1130 and the storage system 1500 (e.g., the paint compositions module 1132 is a sub-module of the processing module 1130). For instance, the paint composition module may comprise and/or manage access to data records for one or more paint compositions. The data records may comprise predictable reflectivity and/or predictable transmissivity, which may be expressed as ranges or maximum values and/or associated with pigmentation information (e.g., different reflectivity/transmissivity ranges for different pigments or pigment ranges). In some embodiments, the data records may also comprise resin chemistry data, surfactants characteristics, wetting agents characteristics and/or flow agents characteristics. The paint composition module may also comprise and/or manage access to data records each associated with a paint pigment having a pigmentation identifier. The data records associated with the paint compositions and/or the pigments may comprise one or more tolerance values for relative humidity in relation to temperature (e.g., air temperature or surface temperature). For instance, the tolerance values may be expressed as a range of relative humidity and temperatures that represent for proper application conditions for the paint composition. The tolerance values may comprise more than one range (e.g., recommended conditions, acceptable conditions, non-acceptable conditions). The tolerance values are set in order to maintain appropriate characteristics of the paint composition. The appropriate characteristics comprise transmissivity and/or reflectivity of the paint composition and may also comprise, in certain embodiments, flow characteristics (i.e., avoid low flow and excessive flow) and drying characteristics of the paint composition (i.e., allow a film to appropriately form and appropriately adhere to the vinyl panels).

In some embodiments, the expert system 1100 may comprise a dedicated application conditions module 1134 dedicated to storing, computing and/or obtaining application conditions data. In other embodiments, alternatively or in addition, functions of the application conditions module 1134 are shared with the processing module 1130 and the storage system 1500 (e.g., the application conditions module 1134 is a sub-module of the processing module 1130). Application conditions data include a thickness indicator for the vinyl panels on which the paint composition(s) is to be applied. The thickness indicator may be expressed as thickness value and/or a thickness value range for purposes of computation, but may also be presented on a scale (e.g., 1 to 5), which may be sufficient for the purpose of the computation and/or desired for the purpose of simplifying the computation. The thickness value or thickness value range may be measured at the paint application using a direct physical measurement tool local to the remote device 1200, 1300 (e.g., a caliper). The thickness value or thickness value range may also be evaluated visually at the site (e.g., by experience of the painter at the paint application site). The thickness value or thickness value range may also be associated with the type of the vinyl panels (e.g., using a trade-mark or other specific sign) leading to the thickness value or range value (e.g., after a lookup in one or more database that may or may not be part of the storage system 1500). The thickness value or thickness value range may also be obtained from a default thickness indicator associated with the paint application site (e.g., information provided by the customer at the paint application site and available to the expert system). The thickness value or thickness value range may also be determined considering a current color of the vinyl panels and/or determined considering an unpainted-color of the vinyl panels. More than one source of thickness data may also be used to come to a final determination of the thickness indicator from multiple values or value ranges. In some embodiments, when the thickness indicator cannot be readily obtained or may be obtained without sufficient confidence, a default thickness value may be set that corresponds to the thinnest possible vinyl panel that could be present at the paint application site (e.g., considering year of installation, color, trademark/type of panel, etc.).

Application conditions data may also comprise environmental conditions data including weather conditions such as maximum air temperature applicable for the paint application site (e.g., obtained from historical data). Other environmental conditions data may also include wind speed and direction, relative humidity and cloud coverage as well as and sun position. When application conditions for a specific date are also to be considered, the application conditions module 1134 may obtain forecast(s) of relevant environmental conditions (e.g., interacting through the network interface module 1140 with a remote forecast provider) and/or actual measurement(s) of relevant environmental conditions (e.g., interacting with one or more instruments (not shown) local to the expert system 1000, local to the remote device 1200, 1300 and/or remote to both the expert system 1100 and the remote device 1200, 1300). The application conditions module 1134 may also store and/or compute temperature data for the vinyl panels to be painted. For instance, surface temperature may be computed, measured directly, or measured directly and thereafter computed to provide an expected variability for a period of time such as a range of temperatures, a maximum value (e.g., when application is expected while air temperature is rising and/or sun is rising) and/or minimum value (e.g., when application is expected while air temperature is dropping and/or sun is setting).

FIG. 1 also shows examples of the storage system 1500 as a distinct database system 1500A, a distinct module 1500B of the computer system 1100, a sub-module 1500C of the memory module 1120 of the computer system 1100, a sub-module 1500D of the paint compositions module 1132 of the computer system 1100 or a sub-module 1500E of the application conditions module 1134 of the computer system 1100. The storage system 1500 may be distributed over different systems A, B, C, D and/or E or may be in a single system. The storage system 1500 may comprise one or more logical or physical as well as local or remote hard disk drive (HDD) (or an array thereof). The storage system 1500 may further comprise a local or remote database made accessible to the computer system 1100 by a standardized or proprietary interface or via the network interface module 1140. The variants of storage system 1500 usable in the context of the present invention will be readily apparent to persons skilled in the art.

Figure 2:
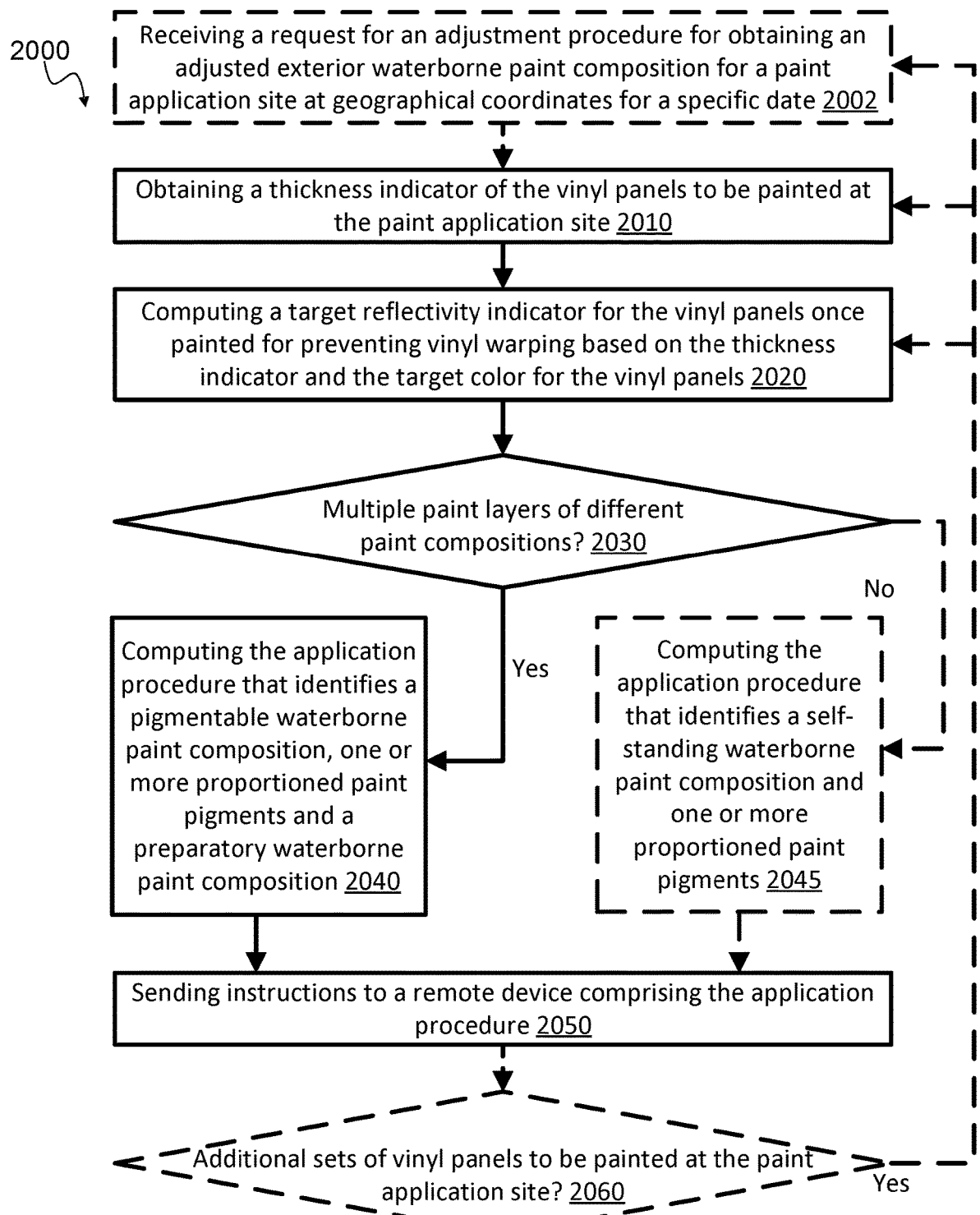
FIG. 2 is a flow chart of a first exemplary method in accordance with an embodiment of the present invention.

Reference is now concurrently made to FIG. 1 and FIG. 2, which show a flow chart of an exemplary method 2000 for computing painting vinyl panels a target color at a paint application site while preventing vinyl warping. The method 2000 comprises obtaining 2010 obtaining a thickness indicator of the vinyl panels to be painted at the paint application site by the processing module 1130 of the expert system 1100. In some embodiments, environmental conditions may also be obtained for the paint application site as explained in greater details elsewhere in the present disclosure in relation to optional features of the present invention. As previously explained, the thickness indicator may be obtained 2010, alternatively or in addition, from one or more actual measurements at the paint application site. The thickness indicator and, when relevant, environmental conditions may be stored and retrieved and/or computed through the application conditions module 1134 of the expert system 1130.

In some embodiments, the thickness indicator is obtained 2010 only after receiving 2002 a request for the paint application procedure from a remote device 1200, 1300 through the network interface module 1140. The expert system 1100 may obtain 2010 the thickness indicator partly or completely from the remote device 1200, 1300 (e.g., in the received 2002 request or in association with the received 2002 request). For instance, one or more instruments (not shown) local to the remote device 1200, 1300, may be used in order to obtain the thickness indicator. The instrument may be in communication with the remote device 1200/1300 (e.g., short range wireless such as Bluetooth or wired) or the expert system 1100 (long range wireless such as WIFI or LTE or wired) or may simply be read by a user to input a value into the Graphical user interface of the remote device 1200/1300. The instrument may also be integrated with the remote device 1200, 1300 or connected via a wire to the remote device 1200, 1300.

The thickness indicator may be obtained 2010 for a single one of the vinyl panels or multiple determination (e.g., measurements) may be made. The thickness indicator obtained 2010 may therefore be a mean values, minimum values and/or maximum values for the vinyl panels. In certain embodiments, different sets of vinyl panels may be determined and treated separately from the perspective of the method 2000 (e.g., different thicknesses, different target color, different geographical alignment, different original color or material, etc.). For instance, the minimum thickness value may be used for the paint application site to obtain 2010 the thickness indicator, thereby ensuring that the target reflectivity will be set for the worst case scenario.

Once the thickness indicator is obtained 2010 for the paint application site at the geographical coordinates for the specific date by the processing module 1130 of the expert system 1100, the method 2000 follows with step 2020. In the step 2020, the processing module 1130 of the expert system 1100 computes 2020 a target reflectivity indicator for the vinyl panels once painted in order to prevent vinyl warping. Of course, the computing 2020 may focus on emissivity instead of reflectivity, as the skilled person will acknowledge from the previous discussion on the subject. The computing 2020 is based on the thickness indicator previously obtained and the target color for the vinyl panels. The maximum air temperature expected at the application site throughout a typical year may also be considered during the computing 2020. A maximum expected irradiance for the vinyl panels may be computed (not shown) considering sun position data for geographical coordinates of the paint application site and/or geographical alignment value of the vinyl panels to be painted. The geographical alignment value of the vinyl panels, or a subset of the vinyl panels, may be provided with different degrees of granularity. For instance, the granularity may be limited to North, South, East or West (or closest 90°). As skilled person will recognize, the granularity could be set anywhere between high precision (to 1°, 5°, 10°, etc.) up to 90°.

More precise substrate identification data for the vinyl panels may optionally be relied upon during the computing 2020 (e.g., specific type of PVC). The computing 2020 of the target reflectivity indicator may involve a more detailed computation (not shown) of specific emissivity value for the vinyl panels once painted the target color. The emissivity may be obtained from a lookup (not shown) into one or more database that may or may not be part of the storage system 1500. In some embodiments, the emissivity database(s) is be built with time (based on results/feedback from past paint jobs) by the expert system 1000 acting as a learning system. In some embodiments, the emissivity may also be computed by extrapolating from existing emissivity data (e.g., exact target color emissivity may be unknown but may be computed/interpolated from different "higher" and "lower" tones around the target color).

Skilled persons will recognize that the detailed substrate identification data may be obtained from one or more default values (i.e., the expert system 1100 is compatible with a single type of substrate or only one type of substrate at a time), may be provided in the received request 2002 or may otherwise be obtained by the expert system 1100 for the paint application site (e.g., provided by the customer or in database of historical contracts).

In some embodiments, emissivity/reflectivity of the vinyl panels may be obtained (not shown) through direct testing. The direct testing may be performed as an empirical step for building a database of relevant data or as an additional validation step (not shown) in the context of the present invention. Tests may be performed on a portion of the vinyl panels themselves at the application site or on a section panel identical in characteristics to the vinyl panels (e.g., test performed at the application site or remote thereto. For instance, extra section panel(s) for the paint application site or section panel(s) known to have the same characteristics may be sued for testing. The test may be performed prior to painting of the test panel (raw capacity), after application of one or more paint layers in accordance with the method 2000 (i.e., validation) or after application of one or more paint layers in accordance with different procedures (i.e., test). The test may involve measurement of the actual temperature of the test panel (e.g., surface temperature from a contact thermometer) and knowledge of the applicable maximum temperature for the test panel before exhibiting vinyl warping (i.e., vicat softening temperature). For instance, an instrument may be applied to a relevant portion of the test panel. When the test is performed at the application site, the instrument may be in communication with the remote device 1200/1300 (e.g., short range wireless such as Bluetooth or wired) or the expert system 1100 (long range wireless such as WIFI or LTE or wired) or may simply be read by a user to input a value into the Graphical user interface of the remote device 1200/1300. The test panel is submitted to controlled irradiance. The temperature of the test panel, once stabilized, may be measured. It is possible to determine whether the test panel exhibits vinyl warping once the controlled irradiance reaches the expected maximum irradiance at the paint application site or to limit the controlled irradiance before the vicat softening temperature is reached. Alternately, or in addition, maximum irradiance tolerated by the test panels before exhibiting vinyl warping may be determined (e.g., considering the measured temperature or when the test panel actually exhibits vinyl warping (destructive test)).

After computing 2020 of the target reflectivity indicator, the method 2000 then continues by determining 2030 at the processing module 1130 of the expert system 1100 that the target reflectivity indicator for the vinyl panels once painted the target color is met by application of multiple paint layers of different paint compositions. The determination 2030 may be made by the expert system 1000 because the target reflectivity cannot be met, or can only be met with difficulty, by a single layer. The expert system 1000 may rely on one or more data records from the storage module 1500 that allow for the computation or determination of a maximum predictable reflectivity for a self-standing waterborne paint composition for the target color (e.g., after adjustment using one or more chemical compounds or as is). For instance, if the maximum predictable reflectivity is lower than the target reflectivity, then more than one layer is required. As mentioned previously, other reasons may allow to determine that more than one layer is required (the target color can more predictably be achieved using two layers, customer request, cost-effectiveness, warranty conditions, etc.) Upon determination 2030 that the target reflectivity at the target color is met by application of the multiple paint layers, the method 2000 continues with the processing module 1130 of the expert system 1000 computing 2040 the application procedure accordingly. That is, the computing 2040 identifies a pigmentable waterborne paint composition considering a predictable transmissivity, one or more proportioned paint pigments to achieve the target color at the predictable transmissivity and a preparatory waterborne paint composition considering a corresponding predictable reflectivity. The computing 2040 is done such that applying the pigmentable waterborne paint composition, once pigmented with the one or more proportioned paint pigments, over the preparatory waterborne paint composition meets the target reflectivity indicator for the vinyl panels at the target color. The computing 2040 may rely on the storage module 1500 having one or more preparatory records each associated with one preparatory waterborne paint composition, having one or more pigmentable records each associated with at least one pigmentable waterborne paint composition and a plurality of pigment records each associated with a paint pigment having a pigmentation identifier. In some embodiments, a single preparatory paint composition may be provided with a predictable reflectivity value. However, the effective reflectivity of the vinyl panels once painted may depend on characteristics of the pigmentable paint composition and of the one or more proportioned pigments therein. The data records may provide one or more range values for the transmissivity/reflectivity considering pigmentation. The data records may also provide the range values for the pigmentable paint composition that vary depending on the characteristics of the preparatory paint composition (e.g., reflectivity characteristics, flow characteristics and/or drying characteristics).

Optionally, the determination 2030 made by the processing module 1130 may be that the target reflectivity indicator for the vinyl panels once painted the target color may be met by application of a self-standing pigmentable waterborne paint composition considering corresponding predictable reflectivity. In such cases, the method 2000 then continues with computing 2045 the application procedure that identifies the self-standing pigmentable waterborne paint composition the one or more proportioned paint pigments to achieve the target color considering corresponding predictable transmissivity. The computing 2045 is done such that applying the self-standing pigmentable waterborne paint composition, once pigmented with the one or more proportioned paint pigments, meets the target reflectivity indicator for the vinyl panels at the target color. The computing 2045 may rely on the storage module 1500 having on one or more self-standing pigmentable records each associated with at least one self-standing waterborne paint composition of predictable transmissivity. The data records may provide one or more range values for the reflectivity considering pigmentation.

The method 2000 then follows with sending 2050 instructions comprising the application procedure for painting the vinyl panels at the target color while preventing vinyl warping.

The application procedure may also specify (not shown) one or more chemical adjustment compounds to be added to the paint composition(s) before the application on the vinyl panels. For instance, the application procedure may provide one or more volumetric values for one or more corresponding adjustment compounds. The method 2000 may also comprise obtaining (not shown) a volume of a container for the paint composition and the application procedure may comprise absolute volumetric values for each the corresponding adjustment compounds. For instance, the adjustment compounds may comprise a surfactant or wetting agent for adjusting surface tension characteristics of the paint composition and/or a flow agent for adjusting levelling characteristics of the paint composition. Some other adjustment compounds may include rheology agent or rheology modifier (e.g., paint thickener) and coalescing solvents or filming agents (e.g., hydrophilic solvent, hydrophobic solvent). Different wetting, flow, rheology and/or filming agents (e.g., even from the same agent type, but having different "strength", premix of different agents, etc.) may alternatively or concurrently be specified in the application procedure.

In some embodiments, the application procedure provides a suggested duration of a mixing or shaking operation appropriately mixing the paint composition, e.g., following addition of the adjustment compounds. The suggested duration may be set by default or may be computed by the processing module 1130 of the expert system 1100 considering the adjustment compounds added and/or total volume added (e.g., relative or absolute values). In some embodiments, the one or more proportioned pigments may each be identified with a relative value established in relation to the pigmentable waterborne paint composition or the self-standing pigmentable waterborne paint composition. Alternately, or in addition, the one or more proportioned pigments may each be identified with an absolute volumetric value established in relation to a volume of a container of the pigmentable waterborne paint composition or the self-standing pigmentable waterborne paint composition.

The method 2000 may also optionally comprise associating (not shown) a tolerance interval with each of the radiology characteristics (transmissivity, reflectivity and/or emissivity).

In some embodiments, the method 2000 may be executed 2060 more than once for additional sets of vinyl panels to be painted at the paint application site. The method 2000 may therefore allow to select different paint compositions for the paint application site, e.g., because the target color is different and/or because of different surface characteristics (e.g., different geographical alignment value).

The method 2000 may also optionally comprise computing an adjustment procedure for adjusting one or more of the waterborne paint compositions using one or more chemical compounds. Computing the adjustment procedure may then further comprise computing an expected surface temperature value of the vinyl panels at an expected time of application. Details of this optional features are provided with reference to FIG. 4 hereinbelow.

In some embodiments, the remote device 1200/1300 comprises a graphical user interface (not shown) for interacting with one or more users (not shown) and may also be a smartphone, a tablet, a phablet, a computer (e.g., portable or fixed to a mobile unit) or other multi-purpose processing device.

Figure 3:
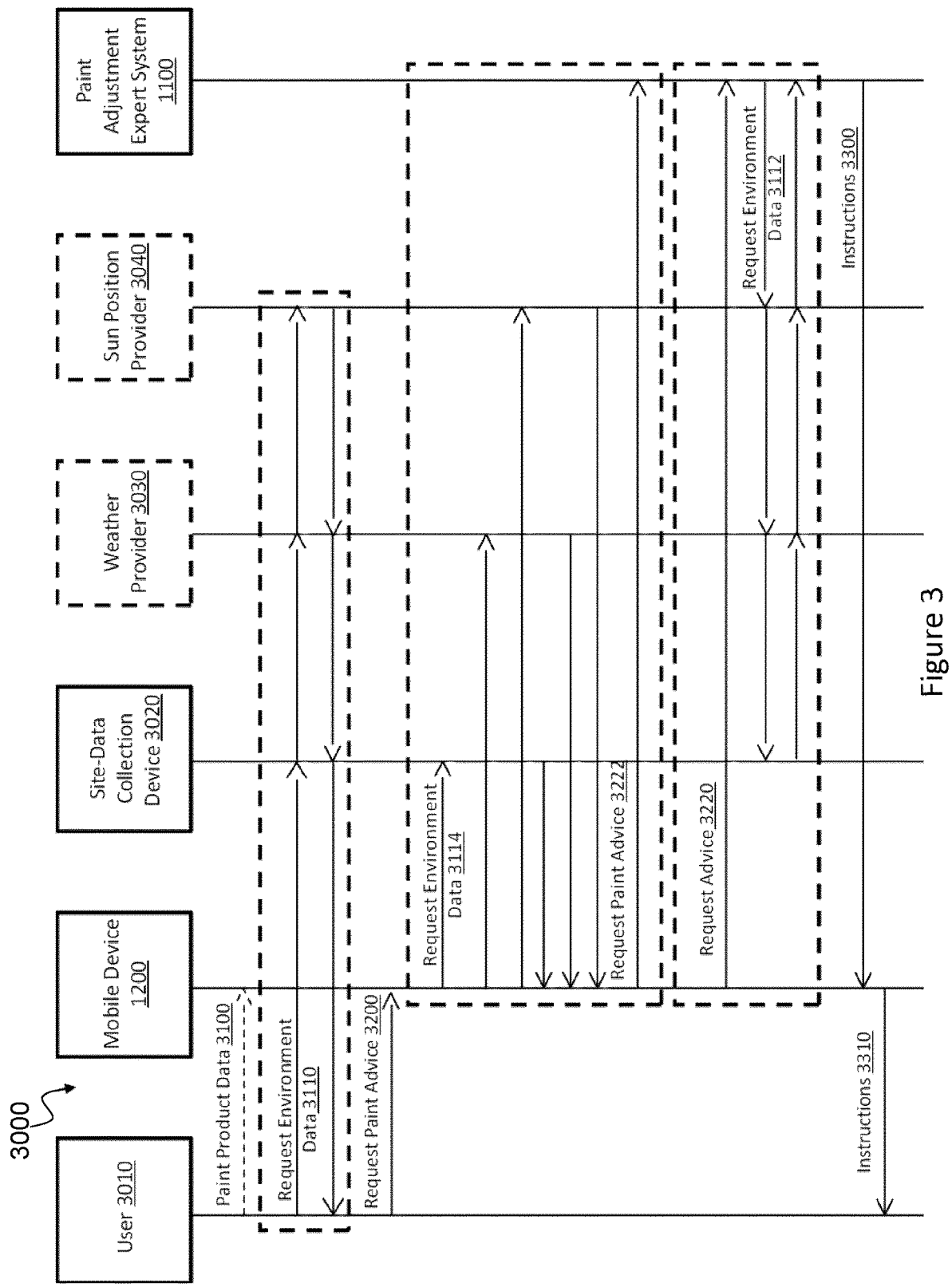
FIG. 3 is a flow and nodal operation chart in accordance with an embodiment of the present invention.

FIG. 3 shows a flow and nodal operation chart in accordance with an exemplary system 3000 in accordance with an embodiment of the present invention for providing instructions to a user 3010 for painting vinyl panels a target color at a paint application site while preventing vinyl warping. The user 3010 has access to a mobile device 1200 and a site-data collection device 3020. Also, depicted in the example of FIG. 3 are optional weather provider 3030 and optional sun position provider 3040 as well as a paint adjustment expert system 1100. The mobile device 1200 may comprise the site-data collection device 3020 (e.g., as a sub-module) or the site-data collection device 3020 may be a standalone device. Likewise, weather and sun position may be provided by external providers 3030/3040 as depicted but may also be provided completely or partially (e.g., validated by external providers) by the mobile device 1200 and/or the site-data collection device 3020.

In the example of FIG. 3, the user 3010 provides the mobile device 1200 with paint product data 3100. The paint product data may, for instance, identify the target color of for the vinyl panels as well as available paint compositions and pigments (e.g., by trademark and/or by chemical characteristics; providing volume or weight of paint, etc.). The paint product data may also comprise one or more available adjustment compounds (e.g., by trademark and/or by chemical characteristics). In some embodiments, the user 3010 may also input a specific date for the paint application or current date may be used. The user 3010 may also input an expected time for the paint application or current time may be used. The user 3010 may also input (not shown) a location for a paint application site. The location, date and/or time may also be obtained by the mobile device 1200 (e.g., using a GPS module thereof) and/or by the site-data collection device 3020 (e.g., using a GPS module thereof). Thickness of the vinyl panels and location of the paint application site as well as additional information concerning the paint application site (e.g., number of exterior surfaces, detailed substrate identification, alignment of exterior surfaces, etc.) may also be provided by the user 3010 and/or retrieved (not shown) from a database storing site-specific information. The location or another identifier (civic address, client name, etc.) may be used to retrieve the site-specific data from the database storing site-specific information.

In some embodiments, the user 3010 requests environmental conditions data 3110 to the site-data collection device 3020. The site-data collection device 3020 may then obtain data from the weather provider 3030 and the sun position provider 3040 before returning the requested environmental conditions data. The user 3010 may also directly request (not shown) the weather data from the weather data provider 3030 and the sun position data from the sun position provider 3040. In these embodiments, the user 3010 then provides the obtained environmental conditions data to the mobile device 1200 in a request for paint advice 3200.

Alternatively to obtaining the environmental conditions data by the user 3010, the user 3010 may send the request for paint advice 3200 without environmental conditions data. As a first option, the mobile device 1200 may then request 3114 environmental conditions data from the site-data collection device 3020, the weather provider 3030 and the sun position provider 3040. The mobile device 1200 may alternatively request the environmental conditions data (not shown) from the site-data collection device 3020, which may then in turn obtain data from the weather provider 3030 and the sun position provider 3040 before returning the requested environmental conditions data. The mobile device 1200 then sends a request 3222 for paint advice to the paint adjustment expert system 1100 with the obtained environmental conditions data. As a second option, the mobile device 1200 may send a request 3220 for paint advice to the paint adjustment expert system 1100 without environmental conditions data. The paint adjustment expert system 1100 may then request 3112 environmental conditions data from the site-data collection device 3020, the weather provider 3030 and the sun position provider 3040. The paint adjustment expert system 1100 may alternatively request the environmental conditions data (not shown) from the site-data collection device 3020, which may then in turn obtain data from the weather provider 3030 and the sun position provider 3040.

The paint adjustment expert system 1100 may receive (not shown) a specific date of application and/or an expected time of application or may alternatively, or by default if none are received, use the current date and time. A default time may also be predetermined (e.g., noon) or only the specific date without expected time may be used by the paint adjustment expert system 1100. The paint adjustment expert system 1100 may also obtain (not shown) a location for a paint application site (e.g., from a database storing site-specific information, from the mobile device 1200 (e.g., using a GPS module thereof) and/or by the site-data collection device 3020 (e.g., using a GPS module thereof)). The location of the paint application site as well as additional information concerning the paint application site (e.g., number of exterior surfaces, detailed substrate identification, alignment of exterior surfaces, etc.) may also be obtained (not shown) by the paint adjustment expert system 1100 from the database storing site-specific information. The location or another identifier (civic address, client name, etc.) may be used to retrieve the site-specific data from the database storing site-specific information.

Once the paint adjustment expert system 1100 obtains the thickness indicator for the vinyl panels, an application procedure is computed by the paint adjustment expert system 1100. Optionally, the environmental conditions data together with location and other relevant information for the paint application site may be used to compute an adjustment procedure. Instructions are then sent 3300 therefrom towards the mobile device 1200 comprising the application procedure and, optionally, the adjustment procedure, for painting vinyl panels a target color at a paint application site while preventing vinyl warping. The mobile device 1200 then provides the instructions 3310 to the user 3010 (e.g., using a Graphical User Interface (GUI) thereof). As mentioned with reference to other examples, some or all of the steps depicted on FIG. 3 may be repeated for different application sites, repeated for different surfaces at a single paint application site and/or repeated for a single surface at different time.

Figure 4:
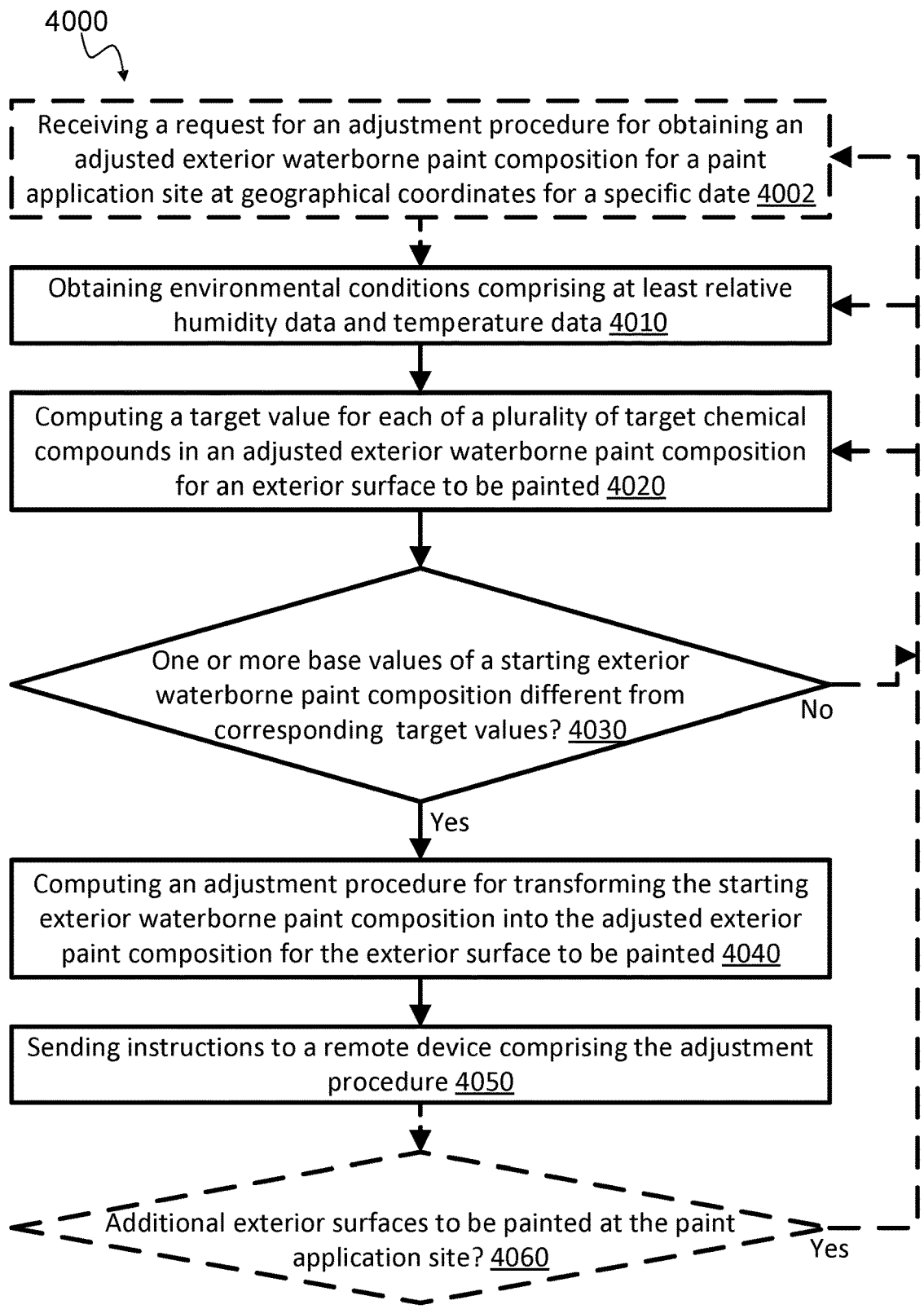
FIG. 4 is a flow chart of a second exemplary method in accordance with an embodiment of the present invention.

Reference is now concurrently made to FIG. 1 and FIG. 4, which show a flow chart of an exemplary method 4000 for computing an adjustment procedure for transforming a starting exterior waterborne paint composition (e.g., the pigmentable paint composition or self-standing paint composition previously discussed) comprising a plurality of base chemical compounds into an adjusted exterior waterborne paint composition for an exterior surface to be painted on a specific date. A base value is associated with each one of the plurality of base chemical compounds in the starting exterior waterborne paint composition.

The method 4000 comprises obtaining 4010 environmental conditions for a paint application site at geographical coordinates for the specific date by the processing module 1130 of the expert system 1100. The environmental conditions comprise relative humidity data for the geographical coordinates and temperature data for the geographical coordinates. The environmental conditions may also comprise sun position data, expected cloud coverage data and/or wind speed value and wind direction or orientation value. The environmental conditions may be obtained 4010 from a weather forecast provider (e.g., government agency, public or private weather network, etc.). The environmental conditions may be obtained 4010 alternatively or in addition from a weather instruments and/or actual measurements. The environmental conditions may also be obtained 4010 by computing data stored at the expert system 1100 and/or retrieved from the forecast provider and/or measurements by the expert system 1100 (e.g., sun position data may be computed from historical data and dew point may be computed from the relative humidity and temperature value). Skilled person will readily acknowledge that providing the dew point for the specific date may be sufficient to compute the relevant relative humidity data. The environmental conditions may be stored and retrieved and/or computed through the application conditions module 1134 of the expert system 1130.

In some embodiments, the environmental conditions are obtained 4010 only after receiving 4002 a request for the adjustment procedure from a remote device 1200, 1300 through the network interface module 1140. The expert system 1100 may obtain 4010 the environmental conditions partly or completely from the remote device 1200, 1300 (e.g., in the received 4002 request or in association with the received 4002 request). For instance, one or more instruments (not shown) of the remote device 1200, 1300 may be used in order to obtain at least some of the environmental conditions. Alternatively, or in addition, the remote device 1200, 1300 may communicate with the weather forecast provider (e.g., government agency, public or private weather network, etc.) and/or networked weather instruments to obtain some or all of the environmental conditions. The temperature data may also be represented by a temperature range.

The environmental conditions may be obtained 4010 for a default time on the specific date (e.g., noon). The environmental conditions may be obtained 4010 as mean values, minimum values and/or maximum values for the specific date or for one or more time periods on the specific date. For instance, the minimum and maximum temperature values may be obtained, the minimum and maximum relative humidity values may be obtained while only the maximum speed value is obtained and only the mean wind orientation value is obtained. When the environmental conditions are obtained 4010 for short time periods on the specific date (e.g., an hour or two hours), only means values may be required (e.g., mean values every hour for the specific date). The time period(s) may also correspond to the morning, afternoon and/or night on the specific date. The time periods may also be determined considering an expected time of application associated with one or more of the surfaces to be painted at the paint application site. For instance, different surfaces may be planned at different application times on the specific date and the different periods may be set in accordance with the expected application times (starting at 7:00 AM, for 2→hours surface A; starting on 7:20, for 4 hours→surface B, starting at 12:00 PM, for 6 hours→surface C, etc.). A maximum time period length may also be set in order to avoid too much gap between the highest and lowest values for one or more of the environmental conditions. For instance, each time period may be limited to 2 hours.

In some embodiments, the environmental conditions 4010 are obtained only once e.g., the day before the specific date (e.g., considering forecast only) or on the specific date (e.g., considering forecast and/or measurements). In some embodiments, the environmental conditions 4010 are obtained more than once (e.g., on the day before the specific date and on the specific date). The adjustment procedure may be computed every time the environmental conditions are obtained 4010 or may be computed only when the environmental condition(s) obtained 4010 from one or more forecasts are determined to be reliable (e.g., considering forecast fluctuations throughout the period of time or throughout the specific date and/or highest/lowest probability of precipitation value(s)).

Once the environmental conditions are obtained 4010 for the paint application site at the geographical coordinates for the specific date by the processing module 1130 of the expert system 1100, the method 4000 follows with step 4020. In the step 4020, The processing module 1130 of the expert system 1100 computing 4020 a target value for each of a plurality of target chemical compounds in an adjusted exterior waterborne paint composition for an exterior surface to be painted. The plurality of target chemical compounds are computed 4020 based on the environmental conditions previously obtained 4010 and substrate identification data for the exterior surface to be painted. Specifically, the plurality of target chemical compounds are computed 4020 based at least on the relative humidity data for the specific date for the geographical coordinates, the temperature data for the specific date for the geographical coordinates and the substrate identification data for the specific date. Computing 4020 the plurality of target values each associated with one of the plurality of target chemical compounds in the adjusted exterior paint composition may also be performed considering an expected time of application for the specific date. Whenever relevant, the expected time of application may be determined from the period of times, used for obtaining 4010 the environmental conditions or vice-versa (i.e., the period of times being determined from the expected time of application).

In some embodiments, the method 4000 may also comprise obtaining (not shown) surface characteristics for the exterior surface to be painted with the adjusted exterior paint composition at the paint application site. The surface characteristics comprises the substrate identification data and may further comprise sun position data for the geographical coordinates, a geographical alignment value of the exterior surface to be painted and an actual and/or expected surface temperature for the exterior surface to be painted. Skilled persons will recognize that the substrate identification data may obtained from one or more default values (i.e., the expert system 1100 is compatible with a single type of substrate or only one type of substrate at a time), may be provided in the received request 4002 or may otherwise be obtained by the expert system 1100 for the paint application site (e.g., provided by the customer or in database of historical contracts). The substrate identification data may be associated to one or more starting paint compositions. For instance, the substrate identification data may comprise identification of the exterior surface to be painted as being PVC cladding, aluminum cladding, wood, a pre-painted water-base surface, a pre-painted oil-base surface, etc. Each of a plurality of starting paint compositions may be associated to each of the substrates.

The geographical alignment value of the exterior surface may be provided with different degrees of granularity. For instance, the granularity main be limited to North, South, East or West (or closest 90°). As skilled person will recognize, the granularity could be set anywhere between high precision (to 1°, 5°, 10°, etc.) up to 90°.

Computing 4020 the plurality of target values each associated with one of the plurality of target chemical compounds in the adjusted exterior paint composition may further comprise computing (not shown), at the processing module 1130 of the expert system 1100, the actual and/or expected surface temperature value of the surface characteristics for the exterior surface considering the relative humidity data at the geographical coordinates and the temperature data for the geographical coordinates. Actual temperature of the surface to be painted may be obtained by direct measurement. For instance, an instrument may be applied to a significant portion of the surface to be painted. The instrument may be in communication with the remote device 1200/1300 (e.g., short range wireless such as Bluetooth or wired) or the expert system 1100 (long range wireless such as WIFI or LTE or wired) or may simply be read by a user to input a value into the Graphical user interface of the remote device 1200/1300. Sun position data, expected cloud coverage data and/or the expected time of application may further be considered by the expert system 1100 when computing the expected surface temperature value of the surface characteristics for the exterior surface to be painted. Likewise, the wind speed value at the geographical coordinates, the wind orientation value at the geographical coordinates and the geographical alignment value may be considered, alternatively or in addition, by the expert system 1100 when computing the expected surface temperature value. The expected surface temperature value may be represented by a temperature range. The temperature range may also be associated with a time range (e.g., between 23° C. and 26° C. between 10:00 and 12:00)

The method 4000 then continues by determining 4030 at the processing module 1130 of the exert system 1100 whether one or more base values of the starting exterior waterborne paint composition is different from corresponding target values as computed in 4020 by the expert system 1100. When the plurality of target values is determined in 4030 to be different from the plurality of base values, the method 4000 continues by computing 4040, at the processing module 1130 of the expert system 1100, an adjustment procedure for transforming the starting exterior waterborne paint composition into the adjusted exterior paint composition for the exterior surface to be painted. Once the procedure is computed 4040, the method continues with sending instructions 4050 to the remote device. The instructions sent 4050 comprise the adjustment procedure for obtaining the adjusted exterior waterborne paint composition from the starting exterior waterborne paint composition for the exterior surface to be painted.

In some embodiments, the adjustment procedure provides one or more volumetric values for one or more corresponding adjustment compounds for the plurality of target values to be determined equivalent to the plurality of base values. The plurality of target values may be determined equivalent to the plurality of base values when each of the plurality of base values is within corresponding tolerance interval(s). The method may then also comprise obtaining (not shown) a volume of a container for the starting exterior paint composition and the adjustment procedure may be absolute volumetric values for each the corresponding adjustment compounds. For instance, the adjustment compounds may comprise a surfactant or wetting agent for adjusting surface tension characteristics of the adjusted paint composition and/or a flow agent for adjusting levelling characteristics of the adjusted paint composition. Some other adjustment compounds may include rheology agent or rheology modifier (e.g., paint thickener) and coalescing solvents or filming agents (e.g., hydrophilic solvent, hydrophobic solvent). Different wetting, flow, rheology and/or filming agents (e.g., even from the same agent type, but having different "strength", premix of different agents, etc.) may alternatively or concurrently be specified in the adjustment procedure.

In some embodiments, the adjustment procedure provides a suggested duration of a mixing or shaking operation appropriately mixing the adjusted paint composition following addition of the adjustment compounds. The suggested duration may be set by default or may be computed by the processing module 1130 of the expert system 1100 considering the adjustment compounds added and/or total volume added (e.g., relative or absolute values).

The method 4000 may also optionally comprise associating (not shown) a tolerance interval with each of the plurality of target values. The plurality of target values is then determined 4030 different from the plurality of base values when at least one base value from the plurality of base values is outside of the corresponding tolerance interval. One or more of the plurality of associated tolerance intervals may be relative values established in relation to the starting exterior paint composition, in relation to the adjusted exterior paint composition and in relation to the associated target value or the corresponding base value. One or more of the plurality of associated tolerance intervals may be an absolute volumetric value established in relation to a volume of a container of the starting exterior paint composition or a remaining volume estimated or measured (e.g., weighted or measured volume).

In some embodiments, the starting paint composition may be a previously adjusted (or may be roughly adjusted) paint composition. A subsequent adjustment procedure (or sequential adjustment procedure) may then further be computed, i.e., similar to 4002-4050 with the previously adjusted paint composition as the starting paint composition. In such an example, the subsequent adjustment procedure may also indicate one or more adjustment compounds to be added. The subsequent adjustment procedure may yet also indicate to dilute the previously adjusted paint composition with a plain (i.e., non-adjusted) starting paint composition and, in some cases, to afterwards add one or more adjustment compounds following dilution.

In some embodiments, the method 4000 may be executed 4050 more than once for additional exterior surface(s) to be painted at the paint application site. The method may therefore allow to transform the starting exterior paint composition into a second adjusted exterior paint composition for a second exterior surface to be painted at the paint application site at the geographical coordinates (e.g., a second container of the same starting composition or a different starting composition selected based on the substrate identification of the second surface). Obtaining the surface characteristics may therefore further comprise obtaining the surface characteristics for the second exterior surface to be painted with the second adjusted exterior paint composition at the paint application site, the surface characteristics comprising the second substrate identification data, a second geographical alignment value and a second actual or expected surface temperature for the second exterior surface to be painted. For instance the same instrument used to measure the actual temperature of the first surface may be used for measuring the temperature of the second surface. The second expected surface temperature value of the surface characteristics may therefore be computed for the second exterior surface considering the relative humidity data at the geographical coordinates, the temperature data for the geographical coordinates and the second geographical alignment value for the second exterior surfaces, and/or wind speed value at the geographical coordinates and wind orientation value at the geographical coordinates.

In some embodiments, the remote device 1200/1300 comprises a graphical user interface (not shown) for interacting with one or more users (not shown) and may also be a smartphone, a tablet, a phablet, a computer (e.g., portable or fixed to a mobile unit) or other multi-purpose processing device. The remote device 1200/1300 may also comprise an adjustment compound distribution module (not shown) for receiving the adjustment procedure and selectively adding one or more adjustment compounds to the starting exterior paint composition in accordance with the adjustment procedure. The adjustment compound distribution module may be a module local to the remote device 1200/1300 (e.g., integrated therewith) or may be a standalone module (not shown) in communication with the remote device 1200/1300 (e.g., using Bluetooth or other short-range wireless protocol, over WIFI, over Ethernet, over USB, etc.). The remote device 1200/1300 may also comprise a paint mixer tool and/or paint shaker tool (not shown) for appropriately mixing the adjusted paint composition following addition of the adjustment compounds. Duration of the mixing or shaking operation may be controlled by the remote device 1200/1300, e.g., in accordance with the received adjustment procedure.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as data, bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. An expert system for computing an application procedure for painting vinyl panels a target color at a paint application site while preventing vinyl warping, the system comprising:
    a non-transitory memory;
    a processing module comprising one or more processors;
    a network interface module comprising one or more physical network interface;
    a first set of software instructions, stored in the non-transitory memory, the first set of software instructions, when executed by the processing module, obtain a thickness indicator of the vinyl panels to be painted at the paint application site considering a request received, for the application procedure at the application site, through the network interface module from a remote device;
    a second set of software instructions, stored in the non-transitory memory, the second set of software instructions, when executed by the processing module, compute, based on the thickness indicator and the target color for the vinyl panels, a target reflectivity indicator for the vinyl panels once painted for preventing vinyl warping;
    a third set of software instructions, stored in the non-transitory memory, the third set of software instructions, when executed by the processing module, determine that the target reflectivity indicator for the vinyl panels once painted the target color is met by application of multiple paint layers of different paint compositions; and
    a fourth set of software instructions, stored in the non-transitory memory, the fourth set of software instructions, when executed by the processing module upon determination that the target reflectivity indicator at the target color is met by application of the multiple paint layers:
        compute the application procedure that identifies:
            a pigmentable waterborne paint composition;—one or more proportioned paint pigments to achieve the target color at a corresponding predictable transmissivity; and—a preparatory waterborne paint composition considering a corresponding predictable reflectivity, wherein applying the pigmentable waterborne paint composition, once pigmented with the one or more proportioned paint pigments, over the preparatory waterborne paint composition on the vinyl panels meets the target reflectivity indicator at the target color; and
        send instructions, through the network interface module to the remote device, comprising the application procedure for painting the vinyl panels at the target color while preventing vinyl warping.

2. The expert system of claim 1, wherein the non-transitory memory comprises
    one or more preparatory records each associated with one of at least one preparatory waterborne paint composition of predictable reflectivity;
    a plurality of pigment records each associated with a paint pigment having a pigmentation identifier; and
    one or more pigmentable records each associated with at least one pigmentable waterborne paint composition of predictable transmissivity once pigmented.

3. The expert system of claim 1, wherein:
    the third set of software instructions, when executed by the processing module, further determine that the target reflectivity indicator for the vinyl panels once painted the target color is met by application of a self-standing pigmentable waterborne paint composition considering corresponding predictable reflectivity; and
    the fourth set of software instructions, when executed by the processing module, compute the application procedure that identifies:
        the self-standing pigmentable waterborne paint composition; and
        the one or more proportioned paint pigments to achieve the target color, wherein applying the self-standing pigmentable waterborne paint composition, once pigmented with the one or more proportioned paint pigments, meets the target reflectivity indicator for the vinyl panels at the target color.

4. The expert system of claim 3, wherein the non-transitory memory further comprises one or more self-standing pigmentable records each associated with at least one self-standing pigmentable waterborne paint composition.

5. The expert system of claim 1, wherein the thickness indicator for the plurality of vinyl panels is a thickness value measured physically at the site, evaluated visually at the site, obtained from a default thickness indicator associated with the paint application site, determined considering a current color of the vinyl panels or determined considering an unpainted-color of the vinyl panels.

6. The expert system of claim 1, further comprising a fifth set of software instructions, stored in the non-transitory memory, the fifth set of software instructions, when executed by the processing module, obtain surface characteristics for the vinyl panels comprising sun position data for geographical coordinates of the painting site and geographical alignment value of the vinyl panels, wherein computing the target reflectivity indicator is further based on the surface characteristics.

7. The expert system of claim 6, further comprising a sixth set of software instructions, stored in the non-transitory memory, the sixth set of software instructions, when executed by the processing module, compute an adjustment procedure for adjusting one or more of the waterborne paint compositions using one or more chemical compounds.

8. The expert system of claim 7, wherein computing the adjustment procedure further comprises computing an expected surface temperature value of the vinyl panels at an expected time of application.

9. The expert system of claim 1, wherein the thickness indicator provides a range thickness value for thicknesses of one or more of the vinyl panels and wherein computing the target reflectivity indicator further comprises matching the range thickness value with an acceptable reflectivity range value.

10. The expert system of claim 1, wherein the one or more proportioned pigments are each identified with a relative value established in relation to the pigmentable waterborne paint composition or the self-standing pigmentable waterborne paint composition.

11. The expert system of claim 1, wherein the one or more proportioned pigments are each identified with an absolute volumetric value established in relation to a volume of a container of the pigmentable waterborne paint composition or the self-standing pigmentable waterborne paint composition.

12. The expert system of claim 1, wherein the sets of software instructions allow for computing of a second application procedure, different from the application procedure, for a second set of vinyl panels.

13. A method for computing an application procedure for painting vinyl panels a target color at a paint application site while preventing vinyl warping, the method comprising:
at a processing module of an expert system, obtaining a thickness indicator of the vinyl panels to be painted at the paint application site considering a request received from a remote device for the application procedure;
computing, at the processing module of the expert system, based on the thickness indicator and the target color for the vinyl panels, a target reflectivity indicator for the vinyl panels once painted for preventing vinyl warping;
determining, at the processing module of the expert system, that the target reflectivity indicator for the vinyl panels once painted the target color is met by application of multiple paint layers of different paint compositions;—upon determination that the target color is met by application of the multiple paint layers:
computing, at the processing module of the expert system, the application procedure that identifies:
a pigmentable waterborne paint composition;
one or more proportioned paint pigments to achieve the target color;
a preparatory waterborne paint composition considering a corresponding predictable reflectivity, wherein applying the pigmentable waterborne paint composition, once pigmented with the one or more proportioned paint pigments, over the preparatory waterborne paint composition meets the target reflectivity indicator for the vinyl panels at the target color; and
sending instructions, through a network interface module to the remote device, comprising the application procedure for painting the vinyl panels at the target color while preventing vinyl warping.

14. The method of claim 13, further comprising:
determining at the processing module that the target reflectivity indicator for the vinyl panels once painted the target color is met by application of a self-standing pigmentable waterborne paint composition considering corresponding predictable reflectivity; and
upon determination that the target reflectivity indicator at the target color is met by application of the self-standing pigmentable waterborne paint composition, computing the application procedure that identifies:
the self-standing pigmentable waterborne paint composition; and
the one or more proportioned paint pigments to achieve the target color, wherein applying the self-standing pigmentable waterborne paint composition, once pigmented with the one or more proportioned paint pigments, meets the target reflectivity indicator for the vinyl panels at the target color.

15. The method of claim 13, wherein the thickness indicator for the plurality of vinyl panels is a thickness value measured physically at the site, evaluated visually at the site, obtained from a default thickness indicator associated with the paint application site, determined considering a current color of the vinyl panels and/or determined considering an unpainted-color of the vinyl panels.

16. The method of claim 13, further comprising obtaining surface characteristics for the vinyl panels comprising sun position data for geographical coordinates of the painting site and geographical alignment value of the vinyl panels, wherein computing the target reflectivity indicator is further based on the surface characteristics.

17. The method of claim 13, further comprising computing an adjustment procedure for adjusting one or more of the waterborne paint compositions using one or more chemical compounds.

18. The method of claim 17, wherein computing the adjustment procedure further comprises computing an expected surface temperature value of the vinyl panels at an expected time of application.

19. The method of claim 13, wherein the thickness indicator provides a range thickness value for thicknesses of one or more of the vinyl panels and wherein computing the target reflectivity indicator further comprises matching the range thickness value with an acceptable reflectivity range value.

20. The method of claim 13, wherein the one or more proportioned pigments are each identified with a relative value established in relation to the pigmentable waterborne paint composition or the self-standing pigmentable waterborne paint composition.

21. The method of claim 13, wherein the one or more proportioned pigments are each identified with an absolute volumetric value established in relation to a volume of a container of the pigmentable waterborne paint composition or the self-standing pigmentable waterborne paint composition.

22. The method of claim 13, further comprising computing a second application procedure, different from the application procedure, for a second set of vinyl panels.

* * * * *